United States Patent

[11] 3,550,747

[72] Inventor Thomas A. Kornylak
 Hamilton, Ohio
[21] Appl. No. 802,905
[22] Filed Feb. 27, 1969
[45] Patented Dec. 29, 1970
[73] Assignee Kornylak Corporation
 Hamilton, Ohio

[54] TRANS-LIFT SECTION CONVEYOR
 5 Claims, 4 Drawing Figs.
[52] U.S. Cl. .................................................. 198/20
[51] Int. Cl. .................................................. B65g 47/04
[50] Field of Search .......................................... 198/20,
 127; 214/512

[56] References Cited
UNITED STATES PATENTS
2,883,032  4/1959  Leaman ........................ 198/20X Primary Examiner—Edward A. Sroka
Attorney—Harold L. Halpert ABSTRACT: A transfer conveyor for conveying a load from a loading conveyor to a vertically movable conveyor in which the latter conveyor is stopped with the load-supporting surfaces above the load supporting surface of the transfer conveyor. The transfer conveyor includes a carriage mounted for movement along guideways containing ramps. The load is shifted from the loading conveyor onto the carriage and the carriage is moved along the ramps to lift the load to the level of the load supporting surface on the vertically movable conveyor. A series of powered rollers carried by the carriage is energized to roll the load onto the vertically movable conveyor.

INVENTOR
THOMAS A. KORNYLAK

BY Harold L. Halpert
AGENT

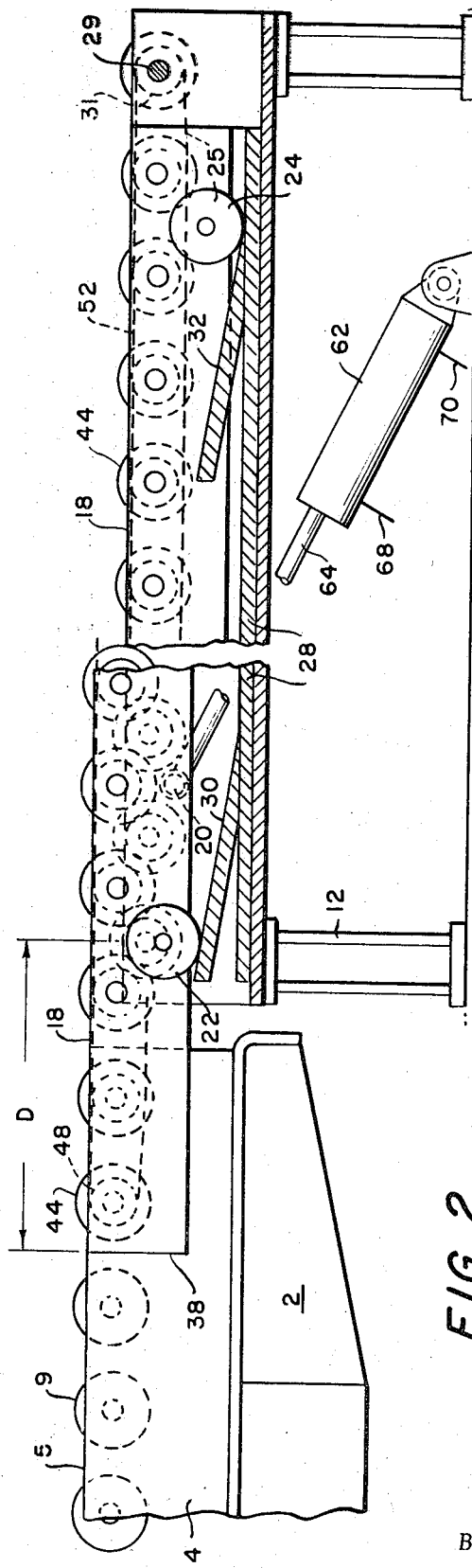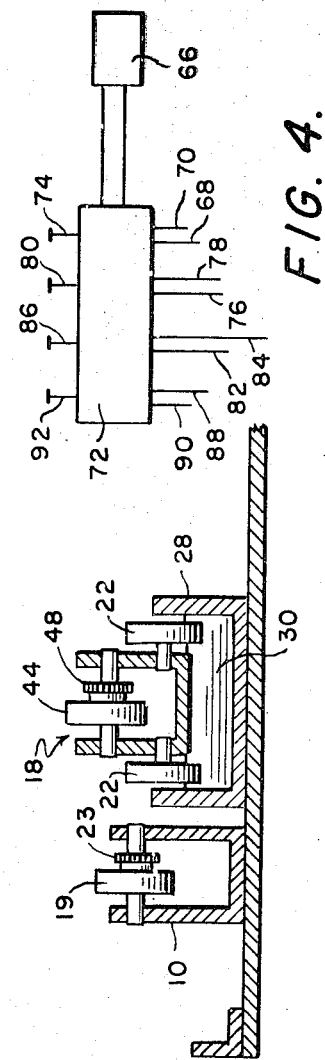
INVENTOR
THOMAS A. KORNYLAK
BY Harold L. Halpert
AGENT

TRANS-LIFT SECTION CONVEYOR

This invention relates to a conveyor and more particularly to a conveyor for use in loading and unloading a vertically movable elevator.

In U.S. Pat. No. 3,365,052 there is disclosed a material handling device comprising a pair of parallel sprocket chains carrying a plurality of shelves pivotally arranged thereon. The shelves are horizontally arranged to carry material between vertically disposed stations and are stopped in their travel at the stations for the purpose of loading and unloading. It has been found that the shelves do not stop in exact alignment with the loading and unloading stations and that mechanical devices cannot be used till the alignment of shelves and stations is within certain tolerances. In some applications the shelves are provided with rollers in order to aid the loading and unloading by rolling the load. The rolls are provided with a driving mechanism to move the load on the shelf.

It is an object of this invention to provide a mechanical device for loading and unloading an elevator in which close alignment of the shelves and stations is unnecessary.

It is a further object of this invention to provide a device as aforesaid in which the drive for the rollers on the shelves is eliminated.

These and other objects of the invention will become manifest upon reading the following description in conjunction with the accompanying diagrammatic drawings in which:

FIG. 2 is a section taken along the line 2–2 of FIG. 1;

FIG. 3 is a section taken on the line 3–3 of FIG. 1; and

FIG. 4 shows a control circuit for the conveyor system.

Figure 1:
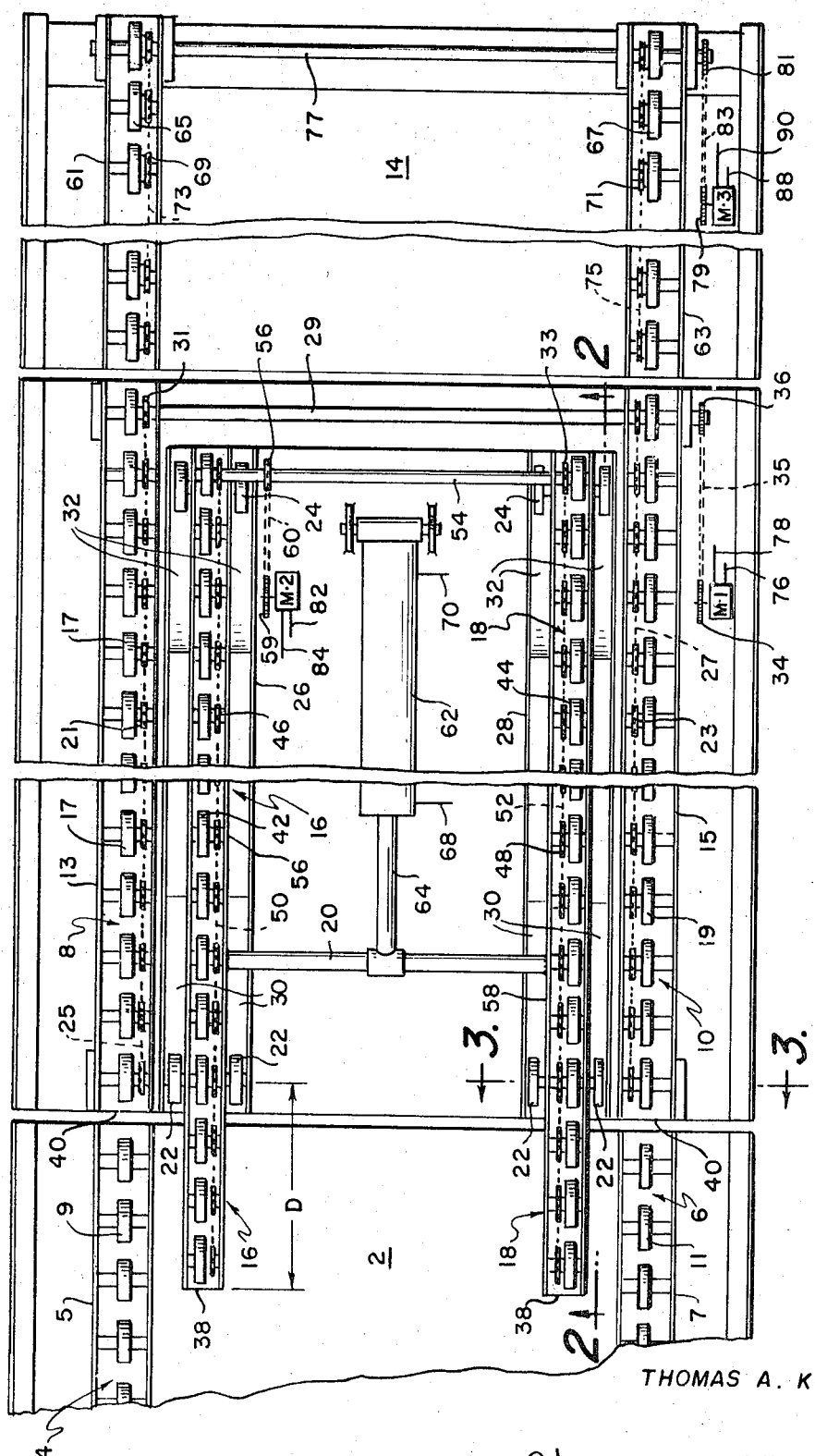
FIG. 1 is a broken plan view of the conveyor in the loading and unloading position.

With reference to FIG. 1 there is shown a shelf 2 corresponding to the shelf disclosed in the aforementioned patent. A pair of rollerways 4 and 6 are secured to the shelf for alignment with fixed rollerways 8 and 10 of the transfer conveyor which are mounted on a fixed support 12. The rollerways 4 and 6 each comprise a channel member 5,7 and a plurality of freely rotatable rollers 9,11 rotatably mounted between the channel walls. The rollerways 8 and 10 each comprise a channel member 13,15 and a plurality of rollers 17,19 rotatably mounted between the channel walls. The rollers 17,19 have fixed thereto sprockets 21,23 in engagement with driving chains 25,27. A shaft 29 is rotatably mounted in the channels and carries sprockets 31 and 33 in driving engagement with chains 25,27. A fluid motor M1 is connected to drive shaft 29 by means of a drive chain 35 engaged with sprockets 34,36 secured to the motor shaft and shaft 29.

A transfer carriage is mounted for travel between a loading conveyor 14 and the shelves 2. The carriage comprises a pair of rollerways 16 and 18 secured together by a rod 20 and a cross brace (not shown) welded to the rollerways to provide a sturdy structure. Each rollerway is supported by front and rear wheels 22 and 24 for travel in laterally spaced guide channels 26 and 28 which form a trackway for the carriage. Each trackway is formed with front and rear ramps 30 and 32 in the form of plates welded to the sides and bottom of the channels 26 and 28. The rear wheels 24 are located adjacent the rear ends of the rollerways and the front wheels are removed from the front ends 38 of the rollerways by a distance D which is slightly longer than the ramp such that when the ends 38 of the rollerways are withdrawn from the shelves by movement of the transfer conveyor to the right, as viewed in FIG. 1, and the wheels are rolled off the ramp, the left ends 38 of the rollerways 16,18 are substantially aligned with the left ends 40 of the fixed rollerways 8 and 10.

The height of the ramps are such as to compensate for maximum misalignment of the shelves and stations.

Each rollerway 16,18 comprises a channel 56,58 and a plurality of rollers 42,44 rotatably mounted between the channel walls and having sprockets 46,48 drivably secured thereto and engaged by chains 50,52. A shaft 54 is rotatably mounted by the channels and carries a sprocket 56. A fluid motor M2 is suitably mounted on the carriage and carries a sprocket 59 connected by a chain 60 to the sprocket 56 to drive the shaft 54 and the chain and sprocket devices 46,50 and 48,52.

The loading conveyor 14 comprises a pair of spaced channels 61,63 having rotatably mounted therein rollers 65,67. Sprockets 69,71 are drivably connected to the rollers and are engaged by chains 73,75 powered by a shaft 77 driven by a fluid motor M3 through sprockets 79,81 and chain 82.

A cylinder 62 is pivotally mounted on a fixed support and contains a slidable piston having a piston rod 64 pivotally connected to rod 20. The cylinder is connected to a source of high pressure fluid 66 through conduits 68,70 and a controller 72. Operation of handle 74 will expel or retract the piston rod to shift the transfer carriage.

Motor M1 is connected to the high pressure fluid source 66 by conduits 76,78 and controller 72. Operation of handle 80 will energize the motor to rotate the sprocket 34. Motor M2 is connected to the high pressure source by conduits 82,84 and controller 72 and is energized by operation of handle 86 to rotate sprocket 59. Motor M3 is connected to the high pressure source by conduits 88,90 and controller 72 and is energized by operation of handle 92 to rotate sprocket 79.

In operation, the load is transferred from the loading conveyor 14 to the transfer conveyor by operating handles 80 and 92 to energize motors M1 and M3 to rotate rollers 65,67 and 17,19 through the respective chain and sprocket trains. Operation of handle 74 will expel the piston rod from cylinder 62 to shift the carriage toward the left as viewed in FIGS. 1 and 2 and up onto the ramps 30,32. The movement of the carriage along the ramps will transfer the load from the fixed ways 8,10 to the ways 16,18 and will carry the load toward the shelf 2. Movement of the carriage is stopped when a plane containing the tops of the rollers 42,44 is substantially coplanar with a plane containing the tops of the rollers 9,11. Operation of handle 86 will energize motor M2 to rotate rollers 42,44 to shift the load onto rollers 9,11. By proper manipulation of handles 74,80,87, and 92 the load can be quickly shifted from the loading conveyor to the vertically movable conveyor 2. In the event the shelf 2 stops with planes containing the tops of the rollers 9,11 and 17,19 being coplanar, the use of the carriage to shift the load is unnecessary. Only in the event that the shelf 2 is stopped with the plane containing the top of rollers 9,11 above the plane containing the top of rollers 17,19 is the use of the carriage necessary. The limit for the distance between said planes is the height of the ramp. In the event of a greater difference the shelves 2 must be shifted to come within the designed difference.

The shifting of the load by the manipulation of handles has been described in detail but it is to be understood that I contemplate the use of automatic devices to accomplish this purpose.

In order to prevent the load from moving beyond the confines of the shelf I provide barriers secured to three sides of the shelf and a locking mechanism at the loading edge of the shelf to allow the load to be moved onto or from the shelf only when the transfer carriage is moved beyond said edge.

Having described my invention I desire it to be understood that further modifications may be made within the skill of the art.

I claim:

1. A material handling device comprising a vertically shiftable conveyor having a load-supporting surface and a transfer conveyor for transferring a load between the said surface of the vertically shiftable conveyor and the transfer conveyor, said transfer conveyor comprising a carriage having a pair of ways, rollers mounted in the ways, means for driving said rollers, and means for simultaneously laterally and vertically shifting said carriage to position a plane containing the tops of said rollers coplanar with said surface.

2. A device as defined in claim 1 wherein said vertically shiftable conveyor comprises a support a pair of ways secured to said support, and independently rotatable rollers mounted in said secured ways for receiving the load from the rollers of the carriage.

3. A device as defined in claim 1 wherein the means for simultaneously shifting said carriage comprises a guideway, wheels carrying said carriage and rollable along said guideway, and ramps in said guideways for engagement by the wheels.

4. A device as defined in claim 3 wherein the means for simultaneously shifting said carriage includes a fluid motor connected to the carriage and a fixed support.

5. A device as defined in claim 2 wherein said transfer conveyor includes a pair of fixed ways in alignment with the secured ways, a plurality of rollers mounted in said fixed ways, and means for driving said rollers.